(12) United States Patent
Walton et al.

(10) Patent No.: US 7,894,548 B2
(45) Date of Patent: Feb. 22, 2011

(54) SPATIAL SPREADING WITH SPACE-TIME AND SPACE-FREQUENCY TRANSMIT DIVERSITY SCHEMES FOR A WIRELESS COMMUNICATION SYSTEM

(75) Inventors: Jay Rodney Walton, Carlisle, MA (US);
John W. Ketchum, Harvard, MA (US);
Mark S. Wallace, Bedford, MA (US);
Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 1142 days.

(21) Appl. No.: 11/217,818

(22) Filed: Sep. 1, 2005

(65) Prior Publication Data
US 2006/0067421 A1 Mar. 30, 2006

Related U.S. Application Data

(60) Provisional application No. 60/608,226, filed on Sep. 8, 2004, provisional application No. 60/607,371, filed on Sep. 3, 2004.

(51) Int. Cl.
*H04L 27/04* (2006.01)
(52) U.S. Cl. .................................................. 375/299
(58) Field of Classification Search .................. 375/299, 375/295, 260, 267, 347; 370/320, 342, 334; 455/69, 101, 209
See application file for complete search history.

(56) References Cited

U.S. PATENT DOCUMENTS 5,757,845 A  5/1998  Fukawa et al.

(Continued)

FOREIGN PATENT DOCUMENTS

CN  1476695 A  2/2004

(Continued)

OTHER PUBLICATIONS

Dammann et al, "Beamforming in Combination with Space-Time Diversity for Broadband OFDM Systems", ICC 2002. 2002 IEEE International Conference on Communications. Conference Proceeding. New York, NY, Apr. 28-May 2, 2002, IEEE International Conference on Communications, New York, NY: IEEE, US, vol. vol. 1 of 5, Apr. 28, 2002), pp. 165-171.

(Continued)

*Primary Examiner*—Khai Tran
(74) *Attorney, Agent, or Firm*—Qualcomm Patent Group; Dmitry R. Milikovsky; James H. Yancey, Jr.

(57) ABSTRACT

Techniques for transmitting data using a combination of transmit diversity schemes are described. These transmit diversity schemes include spatial spreading, continuous beamforming, cyclic delay diversity, space-time transmit diversity (STTD), space-frequency transmit diversity (SFTD), and orthogonal transmit diversity (OTD). A transmitting entity processes one or more ($N_D$) data symbol streams based on a transmit diversity scheme (e.g., STTD, SFTD, or OTD) to generate multiple ($N_C$) coded symbol streams. Each data symbol stream may be sent as a single coded symbol stream or as multiple (e.g., two) coded symbol streams using STTD, SFTD, or OTD. The transmitting entity may perform spatial spreading on the $N_C$ coded symbol streams with different matrices to generate multiple ($N_T$) transmit symbol streams for transmission from $N_T$ antennas. Additionally or alternatively, the transmitting entity may perform continuous beamforming on the $N_T$ transmit symbol streams in either the time domain or the frequency domain.

39 Claims, 4 Drawing Sheets

U.S. PATENT DOCUMENTS

| | | | |
|---|---|---|---|
| 6,144,711 A | 11/2000 | Raleigh et al. | |
| 6,175,743 B1 | 1/2001 | Alperovich | |
| 6,198,775 B1 | 3/2001 | Khayrallah et al. | |
| 6,473,467 B1 | 10/2002 | Wallace et al. | |
| 6,982,946 B2 | 1/2003 | Niclas et al. | |
| 6,542,556 B1 | 4/2003 | Kuchi et al. | |
| 6,618,454 B1 | 9/2003 | Agrawal et al. | 375/347 |
| 6,678,263 B1* | 1/2004 | Hammons et al. | 370/342 |
| 6,711,124 B2 | 3/2004 | Khayrallah et al. | |
| 6,804,307 B1 | 10/2004 | Popovic | |
| 6,842,487 B1* | 1/2005 | Larsson | 375/260 |
| 6,847,306 B2 | 1/2005 | Diba et al. | |
| 6,940,917 B2 | 9/2005 | Menon et al. | |
| 6,975,668 B2 | 12/2005 | Zhang | |
| 6,999,472 B2* | 2/2006 | Hamalainen et al. | 370/468 |
| 7,020,110 B2 | 3/2006 | Walton et al. | |
| 7,031,669 B2 | 4/2006 | Vaidyanathan et al. | |
| 7,061,969 B2 | 6/2006 | Alamouti et al. | |
| 7,095,987 B2 | 8/2006 | Brothers, Jr. et al. | |
| 7,149,254 B2 | 12/2006 | Sampath et al. | |
| 7,190,734 B2 | 3/2007 | Giannakis et al. | |
| 7,194,042 B2 | 3/2007 | Walton et al. | |
| 7,292,623 B2 | 11/2007 | Reznik | |
| 7,302,009 B2 | 11/2007 | Walton et al. | |
| 7,324,429 B2 | 1/2008 | Walton et al. | |
| 7,324,482 B2 | 1/2008 | Hammons, Jr. et al. | |
| 7,336,746 B2 | 2/2008 | Walton et al. | |
| 7,356,073 B2 | 4/2008 | Heikkila | |
| 7,436,896 B2 | 10/2008 | Hottinen et al. | |
| 2002/0034217 A1 | 3/2002 | Zhang et al. | |
| 2002/0172264 A1 | 11/2002 | Wiberg et al. | |
| 2002/0196742 A1 | 12/2002 | Baker et al. | |
| 2003/0016637 A1 | 1/2003 | Khayrallah et al. | |
| 2003/0043929 A1* | 3/2003 | Sampath | 375/267 |
| 2003/0073464 A1 | 4/2003 | Giannakis et al. | |
| 2003/0112745 A1 | 6/2003 | Zhuang et al. | |
| 2003/0228850 A1* | 12/2003 | Hwang | 455/101 |
| 2004/0002364 A1 | 1/2004 | Trikkonen | |
| 2004/0008126 A1 | 1/2004 | Diba et al. | |
| 2004/0042439 A1 | 3/2004 | Menon et al. | 370/343 |
| 2004/0048584 A1 | 3/2004 | Vaidyanathan et al. | 455/103 |
| 2004/0081263 A1 | 4/2004 | Lee et al. | |
| 2004/0082356 A1 | 4/2004 | Walton et al. | 455/522 |
| 2004/0136349 A1 | 7/2004 | Walton et al. | 370/338 |
| 2004/0146014 A1* | 7/2004 | Hammons et al. | 370/320 |
| 2004/0146018 A1 | 7/2004 | Walton et al. | 370/329 |
| 2005/0002440 A1* | 1/2005 | Alamouti et al. | 375/141 |
| 2005/0175115 A1 | 8/2005 | Walton et al. | |
| 2005/0265275 A1 | 12/2005 | Howard et al. | |
| 2006/0050770 A1 | 3/2006 | Wallace et al. | |
| 2008/0031372 A1 | 2/2008 | Walton et al. | |
| 2008/0031374 A1 | 2/2008 | Walton et al. | |
| 2008/0095282 A1 | 4/2008 | Walton et al. | |

FOREIGN PATENT DOCUMENTS

| | | |
|---|---|---|
| EP | 0752793 | 1/1997 |
| EP | 0905920 | 3/1999 |
| EP | 1009124 | 6/2000 |
| EP | 1223702 | 7/2002 |
| EP | 1241824 | 9/2002 |
| EP | 1361686 | 11/2003 |
| JP | 2002524972 T | 8/2002 |
| JP | 2003530010 T | 10/2003 |
| JP | 2006545423 | 6/2007 |
| JP | 2006545774 | 9/2007 |
| KR | 200260860 | 7/2002 |
| KR | 20060123496 A | 12/2006 |
| RU | 2202152 | 4/2003 |
| WO | 0156218 | 8/2001 |
| WO | WO 02/25857 A1 | 3/2002 |
| WO | WO 03/101029 A1 | 4/2003 |
| WO | 03050968 | 6/2003 |
| WO | 03056742 | 7/2003 |
| WO | 03071711 | 8/2003 |
| WO | 04002011 | 12/2003 |
| WO | WO2004021605 A1 | 3/2004 |
| WO | 2004038987 | 5/2004 |
| WO | WO2004038984 A2 | 5/2004 |
| WO | WO 2004038985 A2 | 5/2004 |
| WO | WO2004039011 A2 | 5/2004 |
| WO | WO 2005/060192 A1 | 6/2005 |

OTHER PUBLICATIONS

International Search Report—PCT/US2005/031467, International Search Authority—European Patent Office—Mar. 16, 2006.

International Preliminary Examination Reoprt—PCT/US2005/031467, International Search Authority—The International Bureau of WIPO—Mar. 6, 2007.

Written Opinion—PCT/US2005/031467, International Search Authority—European Patent Office—Mar. 16, 2006.

Agustin A et al; "LDC Construction with a Defined Structure [MIMO Linear Dispersive Codes]" Vehicular Technology Conference, 2003, VTC 2003-Fall. 2003 IEEE 58th Orlando, FL USA Oct. 6-9, 2003, Piscataway, NJ, USA, IEEE. US. Oct. 6, 2003, pp. 433-437.

Alamouti, Siavash M., "A Simple Transmit Diversity Technique for Wireless Communications." IEEE Journal on Select Areas in Communications. vol. 16, No. 8, pp. 1451-1458 (1998).

Doonstnejad et al., "Space-time Spreading Codes for a Multiuser MIMO System", Institute of Electrical and Electronics Engineers, Converence Rocord of the 36th Ailomar Conference on Signals, Systems, and Computers Pacific Grove, CA Nov. 3-Nov. 6, 2002, pg.

Farrokhi et al., "Link-Optimal Space-Time Processing With Multiple Transmit and Receive Antennas," IEEE Communications Letters, vol. 5, No. 3, pp. 85-87(2001).

Goldsmith et al. "Capacity Limits of MIMO Channles" IEE Jouranl on Selected Areas in Communications. vol. 21, No. 5, pp. 684-702. 2003.

Hanzo, L. et al., "Space-Time Spreading Aided Single-Carrier Wideband CDMA Communicating Over Multipath Nakagami Fading Channels" Ph. 8, pp. 279-310 John Wiley & Sons. England, 2003 (XP002357231).

Hochwald et al., "A Transmitter Diversity Scheme for Wideband CDMA Systems based on Space-time Spreading", Selected Areas in Communications, vol. 19, No. 1, pp. 48-60 Jan. 2001.

Hochwald et al., "Systematic Design of Unitary Space-Time Constellations," IEEE Transactions on Information Theory, vol. 46, No. 6, pp. 1962-1973 (2000).

Hochwald et al., "Unitary Space-Time Modulation for Multiple-Antenna Communications in Rayleigh Flat Fading," IEEE Transactions on Information Theory, vol. 46, No. 2 pp. 543-564 (2000).

Li et al., "Transmit Diversity Over Quasi-Static Fading Channels Using Multiple Antennas and Random Signal Mapping." IEEE Transactions of Communications. vol. 51, No. 11. pp. 1918-1925 (2003).

Marzetta et al., "Structured Unitary Space-Time Autocoding Constellations," IEEE Transactions on Information Theory, vol. 48, No. 4 pp. 942-950 (2002).

Medles et al., "Multistrearn Space-Time Coding by Spatial Spreading, Scrambling and Delay Diversity," IEEE International Conference on Acoustics. Speech and Signal Processing. vol. 4 of 4. XP-10803692 (2002).

Sharif et al., "On the Capacity of MIMO Broadcast Channel with Partial Side Information, Signals, Systems and Computers 2003", Conference Record of the Thirty-Seventh Asilomar Conference, Nov. 12, 2003.

Yao, Huan. "Efficient Signal Code, and Receiver Designs for MIMO Communication Systems" Ph.D. Thesis, Massachusetts Institute of Technology; Cambridge. Massachusetts, 2003.

Yu and Cioffi. "Trellis Precoding for the Broadcast Channel," IEEE Global Telecommunications Conference, vol. 2, Electrical Engineering Department, Stanford, University. Stanford, California (2001), pp. 1344-1348.

Sharif et al., "On the Capacity of MIMO Broadcast Channel with Partial Side Information", Department of Electrical Engineering, CA Institute of Engineering, IEEE 2002, pp. 958-962.

Jung-Tao Liu., Successive decoding of multiple space time coded streams in multi-input multi-output systems, Global Telecommunications Conference, 2002. Globecom '02. IEEE, USA, Nov. 21, 2002, 1007-1011 vol. 1.

Suthaharan et al., Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.

Ketchum, et al., "PHY Design for Spatial Multiplexing MIMO WLAN", IEEE 802.11-04/0721rO, IEEE, Jul. 2004.

* cited by examiner

SPATIAL SPREADING WITH SPACE-TIME AND SPACE-FREQUENCY TRANSMIT DIVERSITY SCHEMES FOR A WIRELESS COMMUNICATION SYSTEM

CLAIM OF PRIORITY UNDER 35 U.S.C. §119

The present Application for Patent claims priority to Provisional Application Ser. No. 60/607,371, entitled "Steering Diversity with Space-Time Transmit Diversity for a Wireless Communication System," filed Sep. 3, 2004, and Provisional Application Ser. No. 60/608,226, entitled "Steering Diversity with Space-Time and Space-Frequency Transmit Diversity Schemes for a Wireless Communication System," filed Sep. 8, 2004, both assigned to the assignee hereof and expressly incorporated herein by reference.

BACKGROUND

1. Field

The present disclosure relates generally to communication, and more specifically to techniques for transmitting data in a multiple-antenna communication system.

2. Background

A multi-antenna communication system employs multiple ($N_T$) transmit antennas and one or more ($N_R$) receive antennas for data transmission. The $N_T$ transmit antennas may be used to increase system throughput by transmitting different data from the antennas or to improve reliability by transmitting data redundantly.

In the multi-antenna communication system, a propagation path exists between each pair of transmit and receive antennas. $N_T \cdot N_R$ different propagation paths are formed between the $N_T$ transmit antennas and the $N_R$ receive antennas. These propagation paths may experience different channel conditions (e.g., different fading, multipath, and interference effects) and may achieve different signal-to-noise-and-interference ratios (SNRs). The channel responses of the $N_T \cdot N_R$ propagation paths may thus vary from path to path, and may further vary over time for a time-variant wireless channel and across frequency for a dispersive wireless channel. The variant nature of the propagation paths makes it challenging to transmit data in an efficient and reliable manner.

Transmit diversity refers to redundant transmission of data across space, frequency, time, or a combination of these dimensions to improve reliability for the data transmission. One goal of transmit diversity is to maximize diversity for the data transmission across as many dimensions as possible to achieve robust performance. Another goal is to simplify the processing for transmit diversity at both a transmitter and a receiver.

There is therefore a need in the art for techniques to transmit data with transmit diversity in a multi-antenna communication system.

SUMMARY

Techniques for transmitting data using a combination of transmit diversity schemes are described herein. These transmit diversity schemes include spatial spreading, continuous beamforming, cyclic delay diversity, space-time transmit diversity (STTD), space-frequency transmit diversity (SFTD), and orthogonal transmit diversity (OTD), all of which are described below.

In an embodiment, a transmitting entity processes (e.g., encodes, interleaves, and symbol maps) one or more ($N_D$) data streams to generate $N_D$ data symbol streams. The transmitting entity further processes the $N_D$ data symbol streams based on a transmit diversity scheme (e.g., STTD, SFTD, or OTD) to generate multiple ($N_C$) coded symbol streams. Each data symbol stream may be sent as a single coded symbol stream or as multiple (e.g., two) coded symbol streams using STTD, SFTD, or OTD. The transmitting entity may perform spatial spreading on the $N_C$ coded symbol streams with different matrices to generate multiple ($N_T$) transmit symbol streams for transmission from $N_T$ antennas. Additionally or alternatively, the transmitting entity may perform continuous beamforming on the $N_T$ transmit symbol streams in either the time domain or the frequency domain. A receiving entity performs the complementary processing to recover the $N_D$ data streams.

Various aspects and embodiments of the invention are described in further detail below.

DETAILED DESCRIPTION

Figure 1:
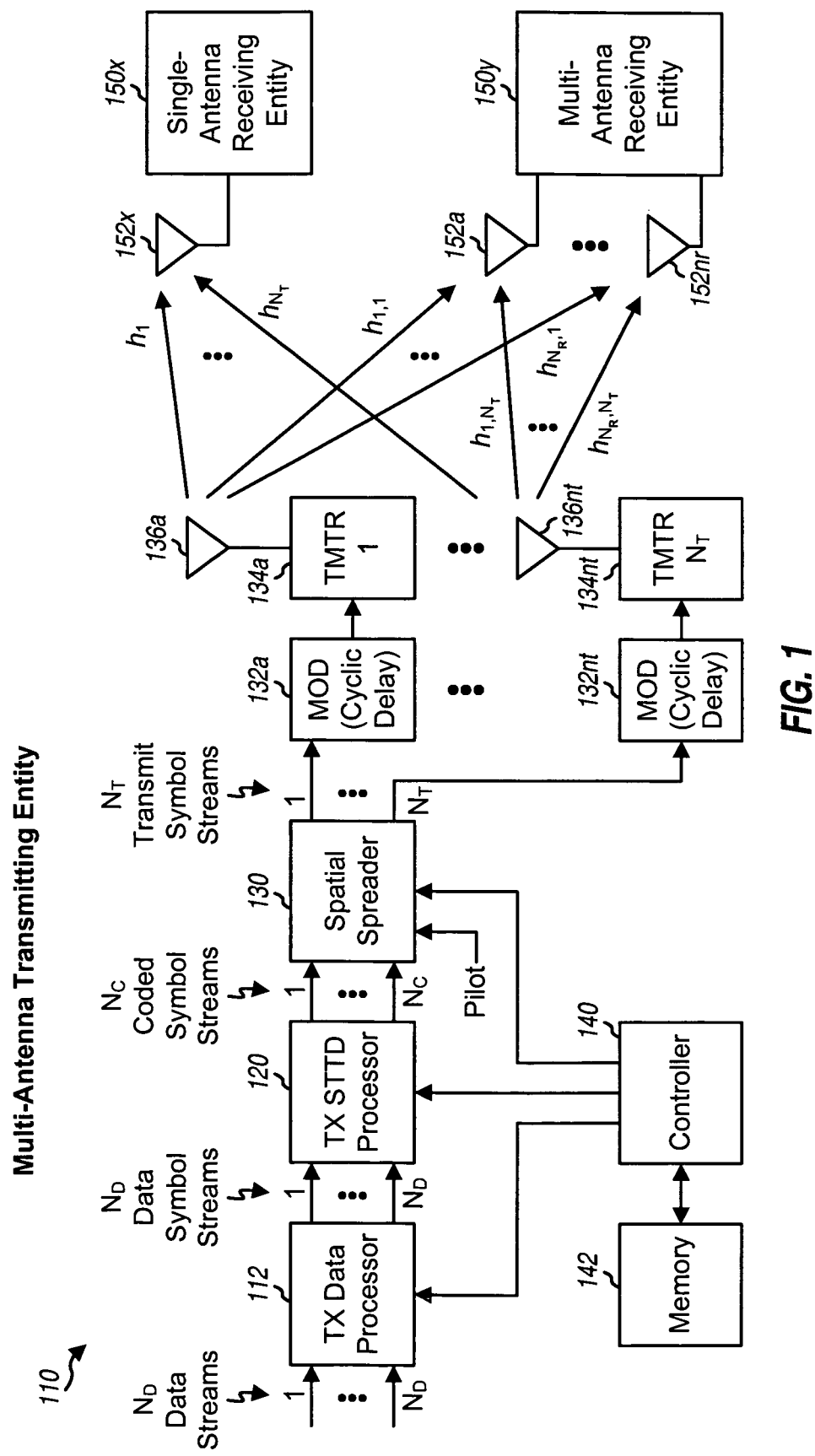
FIG. 1 shows a block diagram of a multi-antenna transmitting entity.

The word "exemplary" is used herein to mean "serving as an example, instance, or illustration." Any embodiment described herein as "exemplary" is not necessarily to be construed as preferred or advantageous over other embodiments.

The transmission techniques described herein may be used for multiple-input single-output (MISO) and multiple-input multiple-output (MIMO) transmissions. A MISO transmission utilizes multiple transmit antennas and a single receive antenna. A MIMO transmission utilizes multiple transmit antennas and multiple receive antennas.

The transmission techniques may be used for single-carrier and multi-carrier communication systems. A multi-carrier system may utilize orthogonal frequency division multiplexing (OFDM), some other multi-carrier modulation scheme, or some other construct. OFDM effectively partitions the overall system bandwidth into multiple ($N_F$) orthogonal frequency subbands, which are also called tones, subcarriers, bins, frequency channels, and so on. With OFDM, each subband is associated with a respective subcarrier that may be modulated with data. A single-carrier system may utilize single-carrier frequency division multiple access (SC-FDMA), code division multiple access (CDMA), or some other single-carrier modulation scheme. An SC-FDMA system may utilize (1) interleaved FDMA (IFDMA) to transmit data and pilot on subbands that are distributed across the overall system bandwidth (2) localized FDMA (LFDMA) to transmit data and pilot on a group of adjacent subbands, or (3) enhanced FDMA (EFDMA) to transmit data and pilot on multiple groups of adjacent subbands. In general, modulation symbols are sent in the time domain with SC-FDMA (e.g., IFDMA, LFDMA, and EFDMA) and in the frequency domain with OFDM. For clarity, much of the description below is for a system that utilizes OFDM, with all $N_F$ subbands being available for transmission.

Transmit diversity may be achieved using various schemes including STTD, SFTD, OTD, spatial spreading, continuous beamforming, and so on. STTD transmits a pair of data symbols from two antennas on one subband in two symbol periods to achieve space and time diversity. SFTD transmits a pair of data symbols from two antennas on two subbands in one symbol period to achieve space and frequency diversity. OTD transmits multiple ($N_O$) data symbols from $N_O$ antennas on one subband in $N_O$ symbol periods using $N_O$ orthogonal codes to achieve space and time diversity, where $N_O \geq 2$. As used herein, a data symbol is a modulation symbol for traffic/packet data, a pilot symbol is a modulation symbol for pilot (which is data that is known a priori by both the transmitting and receiving entities), a modulation symbol is a complex value for a point in a signal constellation for a modulation scheme (e.g., M-PSK or M-QAM), a transmission symbol (e.g., an OFDM symbol) is a sequence of time-domain samples generated by a single-carrier or multi-carrier modulation scheme for one symbol period, and a symbol is typically a complex value.

Spatial spreading refers to the transmission of a symbol from multiple transmit antennas simultaneously, possibly with different amplitudes and/or phases determined by a steering vector used for that symbol. Spatial spreading may also be called steering diversity, transmit steering, pseudo-random transmit steering, space-time scrambling, and so on. Spatial spreading may be used in combination with STTD, SFTD, OTD, and/or continuous beamforming to improve performance and/or to extend the normal operation of these transmit diversity schemes. For example, STTD normally transmits one data symbol stream from two antennas. Spatial spreading may be used with STTD to transmit more than one data symbol stream from more than two antennas simultaneously.

Continuous beamforming refers to the use of different beams across the $N_F$ subbands. The beamforming is continuous in that the beams change in a gradual instead of abrupt manner across the subbands. Continuous beamforming may be performed in the frequency domain by multiplying the symbols for each subband with a beamforming matrix for that subband. Continuous beamforming may also be performed in the time domain by applying different cyclic delays for different transmit antennas. Time-domain continuous beamforming is also called cyclic delay diversity.

Transmit diversity may be achieved using a combination of transmit diversity schemes. For example, transmit diversity may be achieved using a combination of STTD, SFTD or OTD with either spatial spreading or continuous beamforming. As another example, transmit diversity may be achieved using a combination of STTD, SFTD, or OTD with both spatial spreading and cyclic delay diversity. For clarity, much of the following description assumes the use of STTD.

FIG. 1 shows a block diagram of an embodiment of a multi-antenna transmitting entity 110, which may be part of an access point or a user terminal. An access point may also be called a base station, a base transceiver system, or some other terminology. A user terminal may also be called a mobile station, a wireless device, or some other terminology.

For the embodiment shown in FIG. 1, transmitting entity 110 may use a combination of STTD, spatial spreading, and continuous beamforming for data transmission. A TX data processor 112 receives and processes $N_D$ data streams and provides $N_D$ data symbol streams, where $N_D \geq 1$. TX data processor 112 may process each data stream independently or may jointly process multiple data streams together. For example, TX data processor 112 may format, scramble, encode, interleave, and symbol map each data stream in accordance with a coding and modulation scheme selected for that data stream. A TX STTD processor 120 receives the $N_D$ data symbol streams, performs STTD encoding on zero, one, or multiple data symbol streams, and provides $N_C$ coded symbol streams, where $N_C \geq N_D$. In general, TX STTD processor 120 may process any number of data symbol streams with STTD, SFTD, OTD, or some other transmit diversity scheme. Each data symbol stream may be sent as one coded symbol stream or multiple coded symbol streams, as described below.

A spatial spreader 130 receives and multiplexes the coded symbols with pilot symbols, performs spatial spreading by multiplying the coded symbols and pilot symbols with different steering matrices, and provides $N_T$ transmit symbol streams for the $N_T$ transmit antennas, where $N_T \geq N_C$. Each transmit symbol is a complex value to be sent from one transmit antenna on one subband in one symbol period. $N_T$ modulators (MOD) 132a through 132nt receive the $N_T$ transmit symbol streams. For an OFDM-based system, each modulator 132 performs OFDM modulation on its transmit symbol stream and provides a stream of time-domain samples. Each modulator 132 may also apply a different cyclic delay for its antenna, as described below. $N_T$ modulators 132a through 132nt provide $N_T$ sample streams to $N_T$ transmitter units (TMTR) 134a through 134nt, respectively. Each transmitter unit 134 conditions (e.g., converts to analog, amplifies, filters, and frequency upconverts) its sample stream and generates a modulated signal. $N_T$ modulated signals from $N_T$ transmitter units 134a through 134 nt are transmitted from $N_T$ transmit antennas 136a through 136 nt, respectively.

Controller 140 controls the operation at transmitting entity 110. Memory 142 stores data and/or program codes for transmitting entity 110.

Transmitting entity 110 may transmit any number of data symbol streams with STTD and any number of data symbol streams without STTD, depending on the number of transmit and receive antennas available for data transmission. The STTD encoding for one data symbol stream may be performed as follows. For each pair of data symbols $s_a$ and $s_b$ to be sent in two symbol periods, TX STTD processor 120 generates two vectors $\underline{s}_1 = [s_a \ s_b]^T$ and $\underline{s}_2 = [s_b^* \ -s_a^*]^T$, where "*" denotes the complex conjugate and "T" denotes the transpose. Alternatively, TX STTD processor 120 may generate two vectors $\underline{s}_1 = [s_a \ -s_b^*]^T$ and $\underline{s}_2 = [s_b \ s_a^*]^T$ for the pair of data symbols $s_a$ and $s_b$. For both STTD encoding schemes, each vector $\underline{s}_t$, for t=1, 2, includes two coded symbols to be sent from $N_T$ transmit antennas in one symbol period, where $N_T \geq 2$. Vector $\underline{s}_1$ is sent in the first symbol period, and vector $\underline{s}_2$ is sent in the next symbol period. Each data symbol is included in both vectors and is thus sent in two symbol periods. The m-th coded symbol stream is formed by the m-th element of the two vectors $\underline{s}_1$ and $\underline{s}_2$. For clarity, the following description is for the STTD encoding scheme with $\underline{s}_1 = [s_a \ s_b]^T$ and $\underline{s}_2 = [s_b^* \ -s_a^*]^T$. For this STTD encoding scheme, the first coded symbol stream includes coded symbols $s_a$ and $s_b^*$, and the second coded symbol stream includes coded symbols $s_b$ and $-s_a^*$.

Table 1 lists four configurations that may be used for data transmission. An $N_D \times N_C$ configuration denotes the transmission of $N_D$ data symbol streams as $N_C$ coded symbol streams, where $N_D \geq 1$ and $N_C \geq N_D$. The first column identifies the four configurations. For each configuration, the second column indicates the number of data symbol streams being sent, and the third column indicates the number of coded symbol streams. The fourth column lists the $N_D$ data symbol streams for each configuration, the fifth column lists the coded symbol stream(s) for each data symbol stream, the sixth column gives the coded symbol to be sent in the first symbol period (t=1) for each coded symbol stream, and the seventh column gives the coded symbol to be sent in the second symbol period (t=2) for each coded symbol stream. The number of data symbols sent in each 2-symbol interval is equal to twice the number of data symbol streams, or $2N_D$. The eighth column indicates the number of transmit antennas required for each configuration, and the ninth column indicates the number of receive antennas required for each configuration.

TABLE 4

| Config | Num Data Symbol Streams $N_D$ | Num Coded Symbol Streams $N_C$ | Data Symbol Stream | Coded Symbol Stream | Coded Symbol (t = 1) $S_1$ | Coded Symbol (t = 2) $S_2$ | Req Num TX Ants $N_T$ | Req Num RX Ants $N_R$ |
|---|---|---|---|---|---|---|---|---|
| 1 × 2 | 1 | 2 | 1 | 1 | $s_a$ | $s_b^*$ | $N_T \geq 2$ | $N_R \geq 1$ |
|  |  |  |  | 2 | $s_b$ | $-s_a^*$ |  |  |
| 2 × 3 | 2 | 3 | 1 | 1 | $s_a$ | $s_b^*$ | $N_T \geq 3$ | $N_R \geq 2$ |
|  |  |  |  | 2 | $s_b$ | $-s_a^*$ |  |  |
|  |  |  | 2 | 3 | $s_c$ | $s_d^*$ |  |  |
| 2 × 4 | 2 | 4 | 1 | 1 | $s_a$ | $s_b^*$ | $N_T \geq 4$ | $N_R \geq 2$ |
|  |  |  |  | 2 | $s_b$ | $-s_a^*$ |  |  |
|  |  |  | 2 | 3 | $s_c$ | $s_d^*$ |  |  |
|  |  |  |  | 4 | $s_d$ | $-s_c^*$ |  |  |
| 3 × 4 | 3 | 4 | 1 | 1 | $s_a$ | $s_b^*$ | $N_T \geq 4$ | $N_R \geq 3$ |
|  |  |  |  | 2 | $s_b$ | $-s_a^*$ |  |  |
|  |  |  | 2 | 3 | $s_c$ | $s_d^*$ |  |  |
|  |  |  | 3 | 4 | $s_e$ | $s_f^*$ |  |  |

As shown in Table 1, a data symbol stream may be sent as two coded symbol streams with STTD or one coded symbol stream without STTD. For the embodiment shown in Table 1, for each data symbol stream sent without STTD, the data symbol sent in the second symbol period (t=2) is conjugated to match the conjugation performed on the data symbol stream(s) sent with STTD. This conjugation of the data symbol stream sent without STTD is for convenience and not required.

For the 1×2 configuration, one data symbol stream is STTD encoded to generate two coded symbol streams. For each 2-symbol interval, vectors $\underline{s}_1 = [s_a \ s_b]^T$ and $\underline{s}_2 = [s_b^* \ -s_a^*]^T$ are generated with data symbols $s_a$ and $s_b$. Vector $\underline{s}_1$ is transmitted from at least two transmit antennas in the first symbol period, and vector $\underline{s}_2$ is transmitted from the same antennas in the second symbol period. A receiving entity uses at least one receive antenna to recover the data symbol stream.

For the 2×3 configuration, two data symbol streams are sent as three coded symbol streams. The first data symbol stream is STTD encoded to generate two coded symbol streams. The second data symbol stream is sent without STTD as the third coded symbol stream. For each 2-symbol interval, vectors $\underline{s}_1 = [s_a \ s_b \ s_c]^T$ and $\underline{s}_2 = [s_b^* \ -s_a^* \ s_d^*]^T$ are generated with data symbols $s_a$, $s_b$, $s_c$ and $s_d$, where $s_a$ and $s_b$ are from the first data symbol stream, and $s_c$ and $s_d$ are from the second data symbol stream. Vector $\underline{s}_1$ is transmitted from at least three transmit antennas in the first symbol period, and vector $\underline{s}_2$ is transmitted from the same antennas in the second symbol period. A receiving entity uses at least two receive antennas to recover the two data symbol streams.

For the 2×4 configuration, two data symbol streams are sent as four coded symbol streams. Each data symbol stream is STTD encoded to generate two coded symbol streams. For each 2-symbol interval, vectors $\underline{s}_1 = [s_a \ s_b \ s_c \ s_d]^T$ and $\underline{s}_2 = [s_b^* \ -s_a^* \ s_d^* \ -s_c^*]^T$ are generated with data symbols $s_a$, $s_b$, $s_c$ and $s_d$, where $s_a$ and $s_b$ are from the first data symbol stream, and $s_c$ and $s_d$ are from the second data symbol stream. Vector $\underline{s}_1$ is transmitted from at least four transmit antennas in the first symbol period, and vector $\underline{s}_2$ is transmitted from the same antennas in the second symbol period. A receiving entity uses at least two receive antennas to recover the two data symbol streams.

For the 3×4 configuration, three data symbol streams are sent as four coded symbol streams. The first data symbol stream is STTD encoded to generate two coded symbol streams. The second data symbol stream is sent without STTD as the third coded symbol stream, and the third data symbol stream is sent without STTD as the fourth coded symbol stream. For each 2-symbol interval, vectors $\underline{s}_1 = [s_a \ s_b \ s_c \ s_e]^T$ and $\underline{s}_2 = [s_b^* \ -s_a^* \ s_d^* \ s_f^*]^T$ are generated with data symbols $s_a$, $s_b$, $s_c$, $s_d$, $s_e$ and $s_f$, where $s_a$ and $s_b$ are from the first data symbol stream, $s_c$ and $s_d$ are from the second data symbol stream, and $s_e$ and $s_f$ are from the third data symbol stream. Vector $\underline{s}_1$ is transmitted from at least four transmit antennas in the first symbol period, and vector $\underline{s}_2$ is transmitted from the same antennas in the second symbol period. A receiving entity uses at least three receive antennas to recover the three data symbol streams.

Table 1 shows four exemplary configurations that may be used for data transmission, with each configuration having at least one data symbol stream sent with STTD. Other configurations may also be used for data transmission. A configuration may also use a combination of STTD, SFTD, and OTD.

In general, any number of data symbol streams may be sent as any number of coded symbol streams from any number of transmit antennas, where $N_D \geq 1$, $N_C \geq N_D$, $N_T \geq N_C$, and $N_R \geq N_D$. Each data symbol stream may or may not be encoded with STTD, SFTD, OTD, or some other transmit diversity scheme. Each data symbol stream may be sent as one coded symbol stream or multiple (e.g., two) coded symbol streams.

The transmitting entity may process the coded symbols for spatial spreading and continuous beamforming, as follows:

$$\underline{x}_t(k) = \underline{B}(k) \cdot \underline{V}(k) \cdot \underline{G}(k) \cdot \underline{s}_t(k), \text{ for } t=1, 2, \qquad \text{Eq (16)}$$

where $\underline{s}_t(k)$ is an $N_C \times 1$ vector with $N_C$ coded symbols to be sent on subband k in symbol period t;

$\underline{G}(k)$ is an $N_C \times N_C$ diagonal matrix with $N_C$ gain values along the diagonal for the $N_C$ coded symbols in $\underline{s}_t(k)$ and zeros elsewhere;

$\underline{V}(k)$ is an $N_T \times N_C$ steering matrix for spatial spreading for subband k;

$\underline{B}(k)$ is an $N_T \times N_T$ diagonal matrix for continuous beamforming for subband k; and $\underline{x}_t(k)$ is an $N_T \times 1$ vector with $N_T$ transmit symbols to be sent from the $N_T$ transmit antennas on subband k in symbol period t.

Vector $\underline{s}_1$ contains $N_C$ coded symbols to be sent in the first symbol period, and vector $\underline{s}_2$ contains $N_C$ coded symbols to be sent in the second symbol period. Vectors $\underline{s}_1$ and $\underline{s}_2$ may be formed as shown in Table 1 for the four configurations in the table.

Gain matrix $\underline{G}(k)$ determines the amount of transmit power to use for each of the $N_C$ coded symbol streams. The gain matrix may be a function of subband index k, as shown in equation (1), or may be a function that is independent of index k. The total transmit power available for transmission may be denoted as $P_{total}$. In an embodiment, equal transmit power is used for the $N_C$ coded symbol streams, and the diagonal elements of $\underline{G}(k)$ have the same value of $\sqrt{P_{total}/N_C}$. In another embodiment, equal transmit power is used for the $N_D$ data symbol streams, and the $N_C$ gain values along the diagonal of $\underline{G}(k)$ are defined to achieve equal transmit power for the $N_D$ data symbol streams. The $N_C$ gain values may or may not be equal depending on the configuration. As an example, for the 2×3 configuration, the first data symbol stream is sent as two coded symbol streams and the second data symbol stream is sent as one coded symbol stream. To achieve equal transmit power for the two data symbol streams, a 3×3 gain matrix $\underline{G}(k)$ may include gain values of $\sqrt{P_{total}/4}$, $\sqrt{P_{total}/4}$, and $\sqrt{P_{total}/2}$ along the diagonal for the three coded symbol streams. Each coded symbol in the third coded symbol stream is then scaled by $\sqrt{P_{total}/2}$ and is transmitted with twice the power as the other two coded symbols sent in the same symbol period. For both embodiments, the $N_C$ coded symbols for each symbol period may be scaled to utilize the maximum transmit power available for each transmit antenna. In general, the diagonal elements of $\underline{G}(k)$ may be selected to utilize any amounts of transmit power for the $N_C$ coded symbol streams and to achieve any desired SNRs for the $N_D$ data symbol streams. The power scaling for the Nc coded symbol streams may also be achieved by scaling the columns of the steering matrix $\underline{V}(k)$ with appropriate gains.

A given data symbol stream (which is denoted as {s}) may be sent as one coded symbol stream (which is denoted as {š}) in various manners. In one embodiment, the gain matrix $\underline{G}(k)$ contains ones along the diagonal, and coded symbol stream {š} is transmitted at the same power level as other coded symbol streams. For this embodiment, data symbol stream {s} is transmitted at lower transmit power than an STTD encoded data symbol stream and hence achieves a lower received SNR at the receiving entity. The coding and modulation for data symbol stream {s} may be selected to achieve the desired performance, e.g., the desired packet error rate. In another embodiment, each data symbol in data symbol stream {s} is repeated and transmitted in two symbol periods. As an example, for the 2×3 configuration, data symbol $s_c$ may be sent in two symbol periods, then data symbol $s_d$ may be sent in two symbol periods, and so on. This embodiment may achieve similar received SNRs for the $N_D$ data symbol streams, which may simplify the coding and modulation at the transmitting entity and the demodulation and decoding at the receiving entity.

Steering matrix $\underline{V}(k)$ spatially spreads the $N_C$ coded symbols for each symbol period such that each coded symbol is transmitted from all $N_T$ transmit antennas and achieves spatial diversity. Spatial spreading may be performed with various types of steering matrices, such as Walsh matrices, Fourier matrices, pseudo-random matrices, and so on, which may be generated as described below. In general, the same steering matrix is used for each data symbol, which may be sent as one or multiple coded symbols. For example, if vectors $\underline{s}_1(k)$ and $\underline{s}_2(k)$ for subband k contain data symbols sent with STTD, then the same steering matrix $\underline{V}(k)$ is used for both vectors $\underline{s}_1(k)$ and $\underline{s}_2(k)$. For a data symbol stream sent without STTD (e.g., data symbol stream 2 in the 2×3 configuration), a different steering matrix may be used for each data symbol. However, if data symbols without STTD encoding are sent with STTD-encoded data symbols (e.g., for the 2×3 and 3×4 configurations), then the same steering matrix is used for both vectors $\underline{s}_1(k)$ and $\underline{s}_2(k)$. Different steering matrices may be used for different subbands and/or different time intervals, where each time interval may span an integer multiple of two symbol periods for STTD.

Matrix $\underline{B}(k)$ performs continuous beamforming in the frequency domain. For an OFDM-based system, a different beamforming matrix may be used for each subband. The beamforming matrix for each subband k may be a diagonal matrix having the following form:

$$\underline{B}(k) = \begin{bmatrix} b_1(k) & 0 & \cdots & 0 \\ 0 & b_2(k) & \cdots & 0 \\ \vdots & \vdots & \ddots & \vdots \\ 0 & 0 & \cdots & b_{N_T}(k) \end{bmatrix}, \text{ for } k = 1, \ldots, N_F, \quad \text{Eq (17)}$$

where $b_i(k)$ is a weight for subband k of transmit antenna i. The weight $b_i(k)$ may be defined as:

$$b_i(k) = e^{-j2\pi \cdot \Delta T_i \cdot l(k) \cdot \Delta f}, \text{ for } i=1, \ldots, N_T \text{ and } k=1, \ldots, N_F, \quad \text{Eq (18)}$$

where $\Delta T_i$ is the time delay on transmit antenna i;

$\Delta f$ is the frequency spacing between adjacent subbands; and $l(k) \cdot \Delta f$ is the actually frequency corresponding to subband index k.

For example, if $N_F=64$, then subband index k may go from 1 to 64, and $l(k)$ may be equal to k−33 and may range from −32 to +31. If the overall system bandwidth is 20 MHz and $N_F=64$, then $\Delta f=20$ MHz/64=3.125 kHz. $l(k) \cdot \Delta f$ provides the actual frequency (in Hertz) for each value of k. The weights $b_i(k)$ shown in equation (3) correspond to a progressive phase shift across the $N_F$ total subbands for each transmit antenna, with the phase shift changing at different rates for the $N_T$ transmit antennas. These weights effectively form a different beam for each subband.

Continuous beamforming may also be performed in the time domain as follows. For each symbol period, an $N_F$-point inverse discrete Fourier transform (IDFT) or inverse fast Fourier transform (IFFT) may be performed on $N_F$ transmit symbols to be sent on $N_F$ subbands of each transmit antenna i to generate $N_F$ time-domain samples for that transmit antenna. The sequence of $N_F$ time-domain samples for each transmit antenna i may be cyclically or circularly delayed by $T_i$. For example, $T_i$ may be defined as: $T_i=(i-1) \cdot \Delta T$, for $i=1, \ldots, N_T$, where $\Delta T$ may be equal to one sample period, a fraction of a sample period, or more than one sample period. A cyclic delay of $N_{cd}$ samples is achieved by moving the last $N_{cd}$ samples in the sequence of $N_F$ time-domain samples to the front of the sequence. The time-domain samples for each antenna are then cyclically delayed by a different amount.

In another embodiment, diversity may be achieved by just delaying (instead of circularly delaying) the $N_T$ time-domain sample sequences for the $N_T$ transmit antennas by different amounts. The $N_T$ time-domain sample sequences would then be transmitted from the $N_T$ transmit antennas starting at different times.

In equation (1), the scaling by the gain matrix $\underline{G}(k)$ may be omitted by setting $\underline{G}(k)=\underline{I}$, the spatial spreading may be omitted by setting $\underline{V}(k)=\underline{I}$, and the continuous beamforming may be omitted by setting $\underline{B}(k)=\underline{I}$, where $\underline{I}$ is the identity matrix containing ones along the diagonal and zeros elsewhere. The transmitting entity may thus selectively perform scaling, spatial spreading, and continuous beamforming by using appropriate matrices. The matrices for spatial spreading and continuous beamforming may also be combined as $\underline{V}_B(k)=\underline{B}(k)\cdot\underline{V}(k)$. The matrices for scaling, spatial spreading, and continuous beamforming may also be combined as $\underline{V}_{BG}(k)=\underline{B}(k)\cdot\underline{V}(k)\cdot\underline{G}(k)$. The transmitting entity may then perform spatial processing on data vector $\underline{s}_1(k)$ with $\underline{V}_B(k)$ or $\underline{V}_{BG}(k)$.

The transmitting entity may also use a combination of SFTD, spatial spreading, and possibly continuous beamforming. For SFTD, the transmitting entity may generate two vectors $\underline{s}_1$ and $\underline{s}_2$ as described above for STTD and may send these vectors on two subbands in one symbol period. For the 1×2 configuration, two vectors $\underline{s}_1=[s_a\ s_b]^T$ and $\underline{s}_2=[s_b^*\ -s_a^*]^T$ may be generated for each pair of data symbols to be sent on two subbands in one symbol period for one data symbol stream. For the 2×3 configuration, two data symbol vectors $\underline{s}_1=[s_a\ s_b\ s_c]^T$ and $\underline{s}_2=[s_b^*\ -s_a^*\ s_d^*]^T$ may be generated for two pair of data symbols to be sent on two subbands in one symbol period for two data symbol streams. For the 2×4 configuration, two vectors $\underline{s}_1=[s_a\ s_b\ s_c\ s_d]^T$ and $\underline{s}_2=[s_b^*\ -s_a^*\ s_d^*\ -s_c^*]^T$ may be generated for two pairs of data symbols to be sent on two subbands in one symbol period for two data symbol streams. For the 3×4 configuration, two vectors $\underline{s}_1=[s_a\ s_b\ s_c\ s_e]^T$ and $\underline{s}_2=[s_b^*\ -s_a^*\ s_d^*\ s_f^*]^T$ may be generated for three pair of data symbols to be sent on two subbands in one symbol period for three data symbol streams. For all configurations, the transmitting entity may spatially spread and transmit vector $\underline{s}_1$ on one subband in one symbol period and may spatially spread and transmit vector $\underline{s}_2$ on another subband in the same symbol period. The two subbands are typically adjacent to one another and are selected to have similar gain and phase responses.

The transmitting entity may also use a combination of OTD, spatial spreading, and possibly continuous beamforming. For OTD, the transmitting entity may generate multiple ($N_O$) vectors $\underline{s}_1$ and $\underline{s}_{N_O}$ and may send these vectors on one subband in $N_O$ symbol periods. For $N_O=2$, the transmitting entity may generate two vectors $\underline{s}_1$ and $\underline{s}_2$ for two data symbols $s_a$ and $s_b$ by (1) multiplying data symbol $s_a$ with a first orthogonal code of $\{+1+1\}$ to generate two coded symbols $s_a$ and $s_a$ for one transmit antenna, (2) multiplying data symbol $s_b$ with a second orthogonal code of $\{+1-1\}$ to generate two coded symbols $s_b$ and $-s_b$ for another transmit antenna, and (3) forming $\underline{s}_1=[s_a\ s_b]^T$ and $\underline{s}_2=[s_a\ -s_b]^T$. In general, $N_O$ data symbols may be multiplied with $N_O$ different orthogonal codes to generate $N_O$ coded symbol sequences for $N_O$ transmit antennas. Each coded symbol sequence contains $N_O$ coded symbols and is generated by multiplying one data symbol with a specific orthogonal code of length $N_O$. The orthogonal codes may be Walsh codes, OVSF codes, and so on, In general, transmit diversity may be achieved in various manners and in the time, frequency and/or spatial domains. In one embodiment, transmit diversity is achieved by multiplying vector $\underline{s}_t(k)$ with steering matrix $\underline{V}(k)$ to generate transmit vector $\underline{x}_t(k)$, as shown in equation (1). In another embodiment, transmit diversity is achieved by cyclically delaying the time-domain samples for each transmit antenna. In yet another embodiment, transmit diversity is achieved with a combination of spatial processing with $\underline{V}(k)$ and cyclic delay of the time-domain samples. For all of the embodiments, vector $\underline{s}_t(k)$ may be formed with STTD, SFTD, OTD, or some other transmit diversity scheme.

Figure 2:
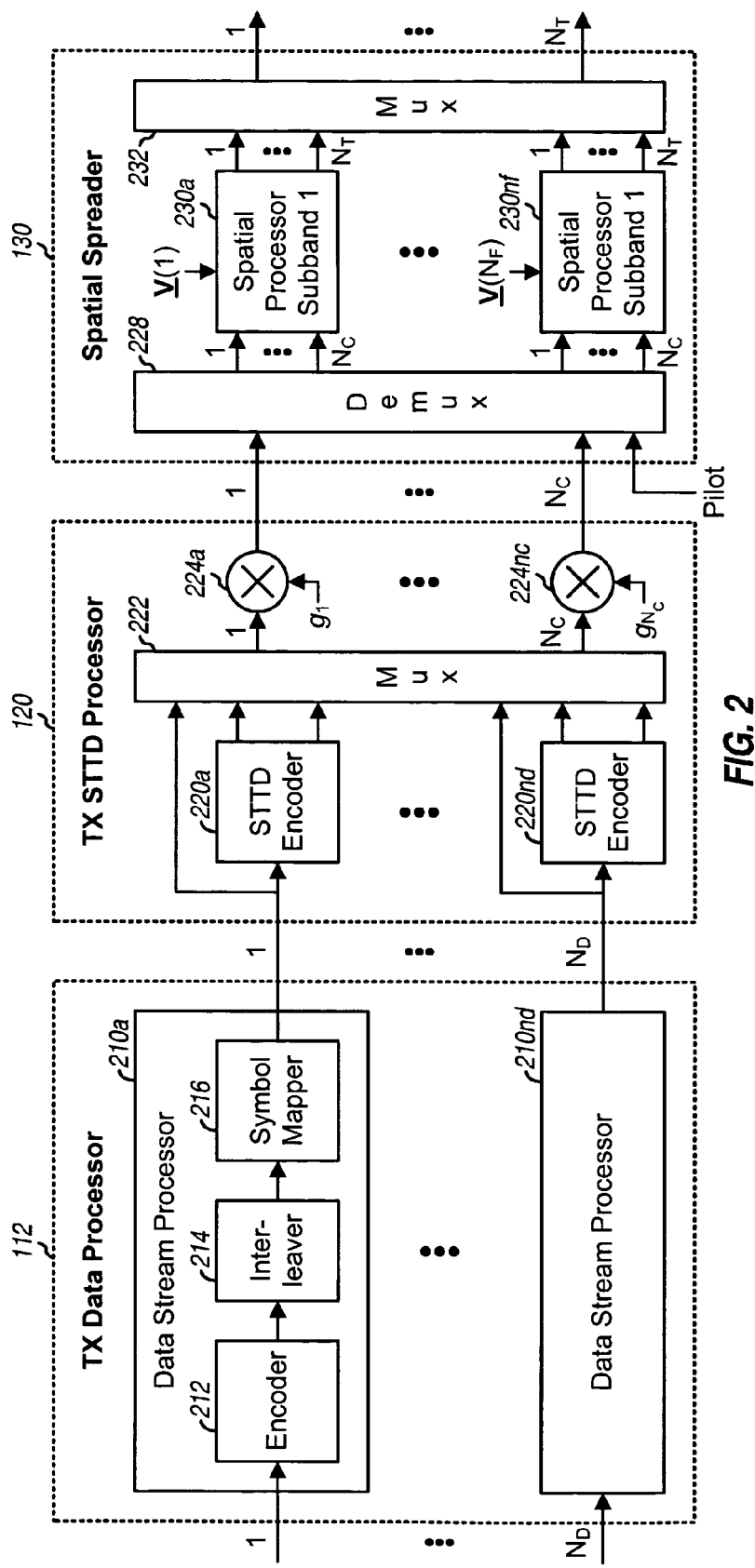
FIG. 2 shows a block diagram of a transmit (TX) data processor, a TX STTD processor, and a spatial spreader at the transmitting entity.

FIG. 2 shows a block diagram of an embodiment of TX data processor 112, TX STTD processor 120, and spatial spreader 130 at transmitting entity 110. For the embodiment shown in FIG. 2, TX data processor 112 includes $N_D$ data stream processors 210a through 210nd that independently process the $N_D$ data streams. Within each data stream processor 210, an encoder 212 encodes traffic data in accordance with a coding scheme and generates code bits. The encoding scheme may include a convolutional code, a Turbo code, a low density parity check (LDPC) code, a cyclic redundancy check (CRC) code, a block code, and so on, or a combination thereof. An interleaver 214 interleaves (or reorders) the code bits based on an interleaving scheme. A symbol mapper 216 maps the interleaved bits in accordance with a modulation scheme and provides data symbols. The coding and modulation for each data stream may be determined by a rate selected for that data stream. Data stream processors 210a through 210nd provide $N_D$ data symbol streams.

In another embodiment, which is not shown in FIG. 2, TX data processor 112 jointly processes the data symbol stream (s) to be sent with STTD and the data symbol stream(s) to be sent without STTD. For example, TX data processor 112 may receive a single data stream, encode the data stream based on a coding scheme, demultiplex the code bits into $N_D$ coded bit streams, and perform interleaving and symbol mapping separately for the $N_D$ coded bit streams to generate $N_D$ data symbol streams. In yet another embodiment, which is also not shown in FIG. 2, TX data processor 112 independently processes the data symbol stream(s) to be sent with STTD and the data symbol stream(s) to be sent without STTD. For example, TX data processor 112 may receive a first data stream to be sent with STTD and a second data stream to be sent without STTD. TX data processor 112 may encode, interleave, symbol map, and demultiplex the first data stream to generate ($N_C-N_D$) data symbol streams to be sent as ($2N_C-2N_D$) coded symbol streams with STTD. TX data processor 112 may also encode, interleave, symbol map, and demultiplex the second data stream to generate ($2N_D-N_C$) data symbol streams to be sent as ($2N_D-N_C$) coded symbol streams without STTD. TX data processor 112 may also process the data stream(s) in other manners, and this is within the scope of the invention.

For the embodiment shown in FIG. 2, TX STTD processor 120 includes $N_D$ STTD encoders 220a through 220nd for the $N_D$ data symbol streams. Each STTD encoder 220 performs STTD encoding on its data symbol stream and provides two coded symbol streams to a multiplexer (Mux) 222. Multiplexer 222 receives the $N_D$ data symbol streams from TX data processor 112 and the $N_D$ pairs of coded symbol streams from STTD encoders 220a through 220nd. For each data symbol stream, multiplexer 222 provides either that data symbol stream or the associated pair of coded symbol streams. Multipliers 224a through 224nc receive and scale the $N_C$ symbol streams from multiplexer 222 with gains $g_1$ through $g_{N_C}$, respectively, and provides $N_C$ coded symbol streams. The scaling may also be performed at other locations within the transmit path.

For the embodiment shown in FIG. 2, spatial spreader 130 includes $N_F$ spatial processors 230a through 230nf for the $N_F$ subbands. A demultiplexer (Demux) 228 receives the $N_C$ coded symbol streams and pilot symbols, provides the coded symbols on subbands and symbol periods used for data transmission, and provides pilot symbols on subbands and symbol periods used for pilot transmission. Each spatial processor 230 receives $N_C$ coded symbols and/or pilot symbols to be sent on the associated subband k in one symbol period, multiplies the coded symbol and/or pilot symbols with a steering matrix $\underline{V}(k)$, and provides $N_T$ transmit symbols to be sent from the $N_T$ transmit antenna on subband k. A multiplexer 232 receives the transmit symbols from all $N_F$ spatial processors 230a through 230nf and maps the $N_T$ transmit symbols from each spatial processor 230 to the $N_T$ transmit symbol streams. Each transmit symbol stream includes $N_F$ transmit symbols from the $N_F$ spatial processors 230a through 230nf for one transmit antenna.

Figure 3:
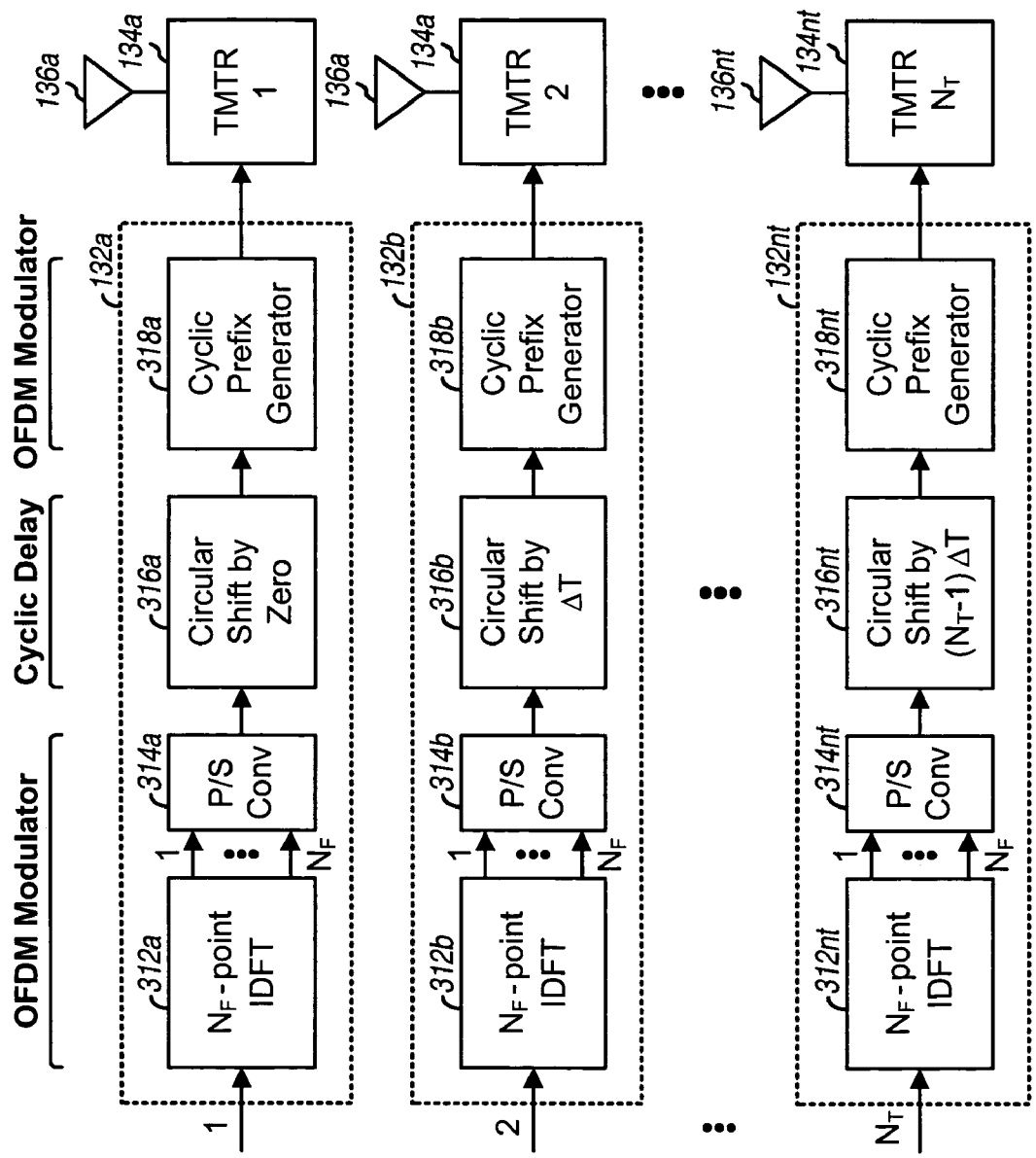
FIG. 3 shows a block diagram of $N_T$ modulators at the transmitting entity.

FIG. 3 shows a block diagram of an embodiment of modulators 132a through 132nt at transmitting entity 110. Within each modulator 132, an IDFT unit 312 performs an $N_F$-point IDFT or IFFT on $N_F$ transmit symbols to be sent on the $N_F$ subbands in one symbol period and provides $N_F$ time-domain samples. A parallel-to-serial converter (P/S Conv) 314 serializes the $N_F$ time-domain samples. A circular shift unit 316 performs a cyclic or circular shift of the $N_F$ time-domain samples by $T_i = (i-1)\cdot\Delta T$, where $\Delta T$ is a fixed period (e.g., one sample period) and $T_i$ is the amount of cyclic shift for transmit antenna i. A cyclic prefix generator 318 receives the $N_F$ circularly shifted samples from unit 316, appends a cyclic prefix of $N_{cp}$ samples, and provides an OFDM symbol (or transmission symbol) containing $N_F + N_{cp}$ samples. The circular shift may be performed prior to appending the cyclic delay (as shown in FIG. 3) or after appending the cyclic delay (not shown in FIG. 3). The time-domain continuous beamforming may be disabled by having circular shift units 316a through 316nt simply pass the time-domain samples from P/S converters 314a through 3164nt to cyclic prefix generators 318a through 3168nt, respectively. Circular shift units 316a through 316 nt may also just delay (instead of circularly delay) the time-domain samples from P/S converters 314a through 3164 nt by different amounts, so that the transmissions from antennas 136a through 136nt are delayed by different amounts.

Figure 4:
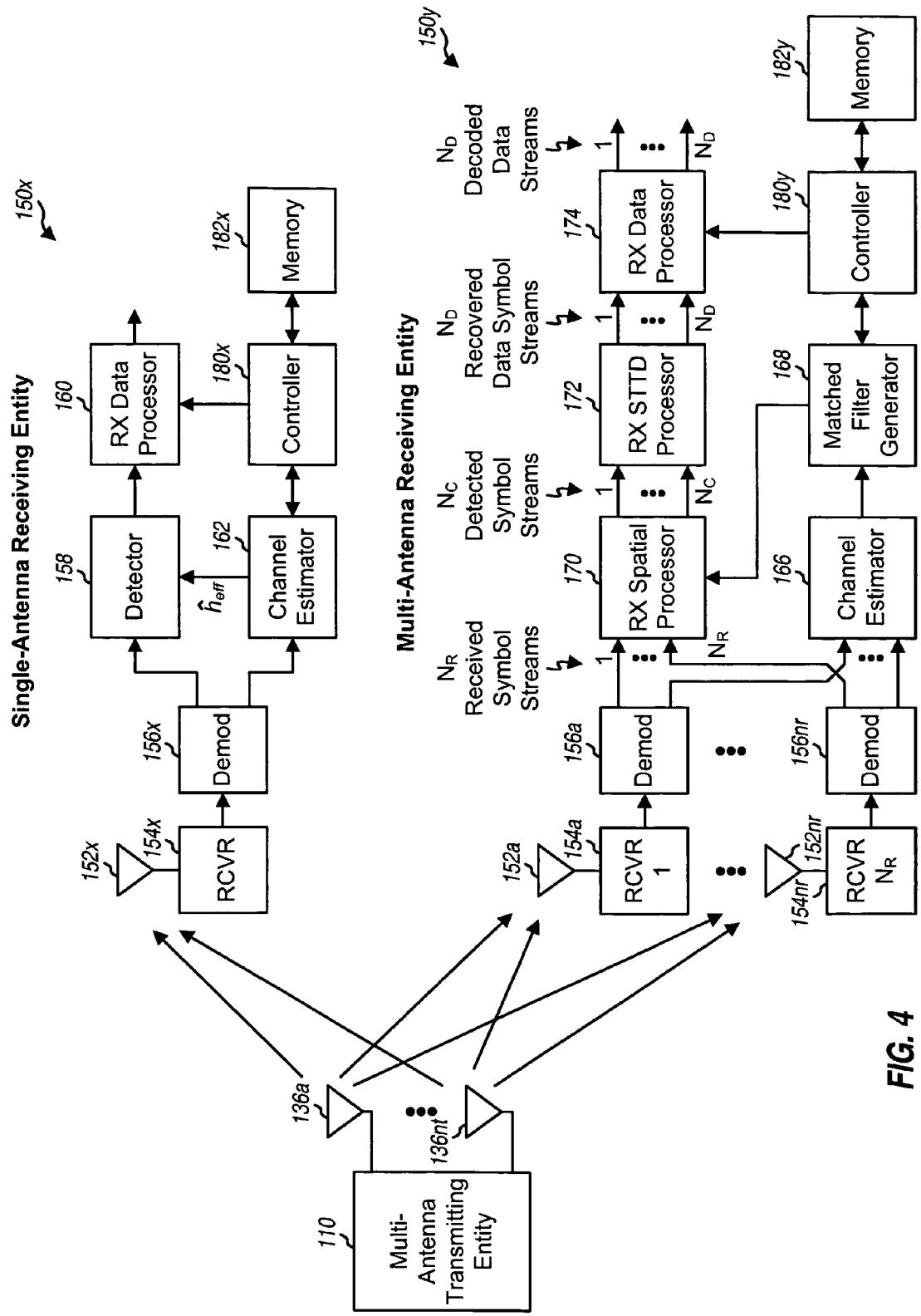
FIG. 4 shows a block diagram of a single-antenna receiving entity and a multi-antenna receiving entity.

FIG. 4 shows a block diagram of an embodiment of a single-antenna receiving entity 150x and a multi-antenna receiving entity 150y. Each receiving entity may be part of a base station or a user terminal.

At single-antenna receiving entity 150x, an antenna 152x receives the $N_T$ modulated signals transmitted by transmitting entity 110 and provides a received signal to a receiver unit (RCVR) 154x. Receiver unit 154x conditions (e.g., amplifies, filters, frequency downconverts, and digitizes) the received signal and provides a stream of received samples to a demodulator (Demod) 156x. For an OFDM-based system, demodulator 156x performs OFDM demodulation on the received samples to obtain received symbols, provides received data symbols to a detector 158, and provides received pilot symbols to a channel estimator 162. Channel estimator 162 derives an effective channel response estimate for a single-input single-output (SISO) channel between transmitting entity 110 and receiving entity 150x for each subband used for data transmission. Detector 158 performs data detection (e.g., equalization) on the received data symbols for each subband based on the effective SISO channel response estimate for that subband and provides recovered data symbols for the subband. An RX data processor 160 processes (e.g., symbol demaps, deinterleaves, and decodes) the recovered data symbols and provides decoded data.

At multi-antenna receiving entity 150y, $N_R$ antennas 152a through 152nr receive the $N_T$ modulated signals, and each antenna 152 provides a received signal to a respective receiver unit 154. Each receiver unit 154 conditions its received signal and provides a received sample stream to an associated demodulator (Demod) 156. Each demodulator 156 performs OFDM demodulation (if applicable) on its received sample stream, provides received data symbols to an RX spatial processor 170, and provides received pilot symbols to a channel estimator 166.

Channel estimator 166 obtains received pilot symbols for all $N_R$ receive antennas and derives a channel response estimate for the actual or effective MIMO channel between transmitting entity 110 and receiving entity 150y for each subband used for data transmission. If transmitting entity 110 performs spatial processing on the pilot symbols in the same manner as the data symbols, as shown in FIG. 1, then the steering matrices may be viewed as being part of the wireless channel. In this case, receiving entity 150y may derive an estimate of the effective MIMO channel, which includes the actual MIMO channel response as well as the effects of the steering matrices. If transmitting entity 110 does not perform spatial processing on the pilot symbols, then receiving entity 150y may derive an estimate of the actual MIMO channel and may then derive an estimate of the effective MIMO channel based on the actual MIMO channel response estimate and the steering matrices.

A matched filter generator 168 derives a spatial filter matrix $\underline{M}(k)$ for each subband used for transmission based on the channel response estimate for that subband. RX spatial processor 170 obtains received data symbols for all $N_R$ receive antennas and performs pre-processing on the received data symbols to account for the STTD scheme used by transmitting entity 110. RX spatial processor 170 further performs receiver spatial processing (or spatial matched filtering) on the pre-processed data symbols for each subband with the spatial filter matrix for that subband and provides detected symbols for the subband. An RX STTD processor 172 performs post-processing on the detected symbols based on the STTD scheme used by transmitting entity 110 and provides recovered data symbols. An RX data processor 174 processes (e.g., symbol demaps, deinterleaves, and decodes) the recovered data symbols and provides decoded data.

Controllers 180x and 180y control the operation at receiving entities 150x and 150y, respectively. Memories 182x and 182y store data and/or program codes for receiving entities 150x and 150y, respectively.

Various types of steering matrices may be used for spatial spreading. For example, steering matrix $\underline{V}(k)$ may be a Walsh matrix, a Fourier matrix, or some other matrix. A 2×2 Walsh matrix $\underline{W}_{2\times2}$ be expressed as $$\underline{W}_{2\times2} = \begin{bmatrix} 1 & 1 \\ 1 & -1 \end{bmatrix}.$$

A larger size Walsh matrix $\underline{W}_{2N\times2N}$ may be formed from a smaller size Walsh matrix $\underline{W}_{N\times N}$, as follows:

$$\underline{W}_{2N\times2N} = \begin{bmatrix} \underline{W}_{N\times N} & \underline{W}_{N\times N} \\ \underline{W}_{N\times N} & -\underline{W}_{N\times N} \end{bmatrix}. \qquad \text{Eq (19)}$$

An N×N Fourier matrix $\underline{D}_{N\times N}$ has element $d_{n,m}$ in the n-th row of the m-th column, which may be expressed as:

$$d_{n,m} = e^{-j2\pi \frac{(n-1)(m-1)}{N}}, \quad \text{Eq (20)}$$

for $n = 1, \ldots, N$ and $m = 1, \ldots, N$.

Fourier matrices of any square dimension (e.g., 2, 3, 4, 5, and so on) may be formed.

A Walsh matrix $\underline{W}_{N \times N}$, a Fourier matrix $\underline{D}_{N \times N}$, or some other matrix may be used as a base matrix $\underline{B}_{N \times N}$ to form other steering matrices. For an N×N base matrix, each of rows 2 through N of the base matrix may be independently multiplied with one of M different possible scalars. $M^{N-1}$ different steering matrices may be obtained from $M^{N-1}$ different permutations of the M scalars for the N−1 rows. For example, each of rows 2 through N may be independently multiplied with a scalar of +1, −1, +j, or −j, where $j = \sqrt{-1}$. For N=4, 64 different steering matrices may be generated from a base matrix $B_{4 \times 4}$ with the four different scalars. Additional steering matrices may be generated with other scalars, e.g., $e^{\pm j3\pi/4}$, $e^{\pm j\pi/4}$, $e^{\pm j\pi/8}$, and so on. In general, each row of the base matrix may be multiplied with any scalar having the form $e^{j\theta}$, where θ may be any phase value. A set of N×N steering matrices may be generated from the N×N base matrix as $\underline{V}(i) = g_N \cdot \underline{B}_{N \times N}^i$, where $g_N = 1/\sqrt{N}$ and $\underline{B}_{N \times N}^i$ is the i-th steering matrix generated with the base matrix $\underline{B}_{N \times N}$. The scaling by $g_N = 1/\sqrt{N}$ ensures that each column of $\underline{V}(i)$ has unit power. The steering matrices in the set may be used for different subbands and/or time intervals.

The steering matrices may also be generated in a pseudo-random manner. The steering matrices are typically unitary matrices having columns that are orthogonal to one another. The steering matrices may also be orthonormal matrices having orthogonal columns and unit power for each column, so that $\underline{V}^H \cdot \underline{V} = \underline{I}$. A steering matrix of dimension that is not square may be obtained by deleting one or more columns of a square steering matrix.

Different steering matrices may be used for different time intervals. For example, different steering matrices may be used for different symbol periods for SFTD and for different 2-symbol intervals for STTD and OTD. For an OFDM-based system, different steering matrices may be used for different subbands for STTD and OTD and for different pairs of subbands for SFTD. Different steering matrices may also be used for different subbands and different symbol periods. The randomization provided by steering diversity (across time and/or frequency) with the use of different steering matrices can mitigate deleterious effects of a wireless channel.

The transmission techniques described herein may be implemented by various means. For example, these techniques may be implemented in hardware, firmware, software, or a combination thereof. For a hardware implementation, the processing units at the transmitting entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques may be implemented with modules (e.g., procedures, functions, and so on) that perform the functions described herein. The software codes may be stored in a memory and executed by a processor. The memory may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to process data symbols based on a transmit diversity scheme to generate coded symbols, and to perform spatial processing on the coded symbols to generate transmit symbols for transmission via a plurality of antennas; and a memory coupled to the at least one processor.

2. The apparatus of claim 1, wherein the at least one processor is configured to perform spatial spreading with a plurality of matrices and to use different matrices for different frequency subbands, different time intervals, or both.

3. The apparatus of claim 1, wherein the at least one processor is configured to perform beamforming with a plurality of matrices and to use different matrices for different frequency subbands.

4. The apparatus of claim 1, wherein the at least one processor is configured to process the data symbols based on a space-time transmit diversity (STTD) scheme to generate the coded symbols.

5. The apparatus of claim 1, wherein the at least one processor is configured to process the data symbols based on a space-frequency transmit diversity (SFTD) scheme to generate the coded symbols.

6. The apparatus of claim 1, wherein the at least one processor is configured to process the data symbols based on an orthogonal transmit diversity (OTD) scheme to generate the coded symbols.

7. The apparatus of claim 1, wherein the at least one processor is configured to obtain at least two data symbols to be sent on a frequency subband in two symbol periods, to process the at least two data symbols based on the transmit diversity scheme to generate two sets of coded symbols, and to provide the two sets of coded symbols for transmission on the frequency subband in two symbol periods.

8. The apparatus of claim 1, wherein the at least one processor is configured to obtain at least two data symbols to be sent on two frequency subbands in a symbol period, to process the at least two data symbols based on the transmit diversity scheme to generate two sets of coded symbols, and to provide the two sets of coded symbols for transmission on the two frequency subbands in the symbol period.

9. The apparatus of claim 1, wherein the at least one processor is configured to perform orthogonal frequency division multiplexing (OFDM) modulation on the transmit symbols for each antenna to generate transmission symbols for the antenna.

10. The apparatus of claim 1, wherein the at least one processor is configured to perform single-carrier frequency division multiple access (SC-FDMA) modulation on the transmit symbols for each antenna to generate transmission symbols for the antenna.

11. The apparatus of claim 1, wherein the at least one processor is configured to apply different cyclic delays for the plurality of antennas.

12. The apparatus of claim 1, wherein the at least one processor is configured to generate transmission symbols for the plurality of antennas based on the transmit symbols, and to cyclically delay the transmission symbols for the plurality of antennas by different non-negative integer numbers of samples.

13. A method comprising:
processing data symbols based on a transmit diversity scheme to generate coded symbols; and
performing spatial processing on the coded symbols to generate transmit symbols for transmission via a plurality of antennas.

14. The method of claim 13, wherein the processing the data symbols based on the transmit diversity scheme comprises
processing the data symbols based on a space-time transmit diversity (STTD) scheme, a space-frequency transmit diversity (SFTD) scheme, or an orthogonal transmit diversity (OTD) scheme to generate the coded symbols.

15. The method of claim 13, wherein the performing spatial processing on the coded symbols comprises
performing spatial spreading with a plurality of matrices, and
using different matrices for different frequency subbands, different time intervals, or both.

16. The method of claim 13, further comprising:
applying different cyclic delays for the plurality of antennas.

17. An apparatus comprising:
means for processing data symbols based on a transmit diversity scheme to generate coded symbols; and
means for performing spatial processing on the coded symbols to generate transmit symbols for transmission via a plurality of antennas.

18. The apparatus of claim 17, wherein the means for processing the data symbols based on the transmit diversity scheme comprises
means for processing the data symbols based on a space-time transmit diversity (STTD) scheme, a space-frequency transmit diversity (SFTD) scheme, or an orthogonal transmit diversity (OTD) scheme to generate the coded symbols.

19. The apparatus of claim 17, wherein the means for performing spatial processing on the coded symbols comprises
means for performing spatial spreading a the plurality of matrices, and
means for using different matrices for different frequency subbands, different time intervals, or both.

20. The apparatus of claim 17, further comprising:
means for applying different cyclic delays for the plurality of antennas.

21. An apparatus comprising:
at least one processor configured to process at least one data symbol stream based on a transmit diversity scheme to generate at least two coded symbol streams, and to perform spatial processing on the at least two coded symbol streams to generate a plurality of transmit symbol steams for transmission via a plurality of antennas; and
a memory coupled to the at least one processor.

22. The apparatus of claim 21, wherein the at least one processor is configured to process the at least one data symbol stream based on a space-time transmit diversity (STTD) scheme, a space-frequency transmit diversity (SFTD) scheme, or an orthogonal transmit diversity (OTD) scheme to generate the at least two coded symbol streams.

23. The apparatus of claim 21, wherein the at least one processor is configured to perform spatial spreading with a plurality of matrices and to use different matrices for different frequency subbands, different time intervals, or both.

24. The apparatus of claim 21, wherein the at least one processor is configured to generate at least one additional data symbol stream to be sent without the transmit diversity scheme, and to perform spatial processing on the at least two coded symbol streams and the at least one additional data symbol stream with the plurality of matrices to generate the plurality of transmit symbol steams.

25. The apparatus of claim 24, wherein the at least one processor is configured to scale the at least two coded symbol streams with at least two gains selected for the at least two coded symbol streams, and to scale the at least one additional data symbol stream with at least one gain selected for the at least one additional data symbol stream.

26. The apparatus of claim 21, wherein the at least one processor is configured to process at least one data stream based on at least one coding and modulation scheme to generate the at least one data symbol stream.

27. A method comprising:
processing at least one data symbol stream based on a transmit diversity scheme to generate at least two coded symbol streams; and
performing spatial processing on the at least two coded symbol streams to generate a plurality of transmit symbol steams for transmission via a plurality of antennas.

28. The method of claim 27, wherein the processing the at least one data symbol stream based on the transmit diversity scheme comprises
processing the at least one data symbol stream based on a space-time transmit diversity (STTD) scheme, a space-frequency transmit diversity (SFTD) scheme, or an orthogonal transmit diversity (OTD) scheme to generate the at least two coded symbol streams.

29. The method of claim 27, wherein the performing spatial processing on the at least two coded symbol streams comprises
performing spatial spreading on the at least two coded symbol streams with a plurality of matrices, and
using different matrices for different frequency subbands, different time intervals, or both.

30. An apparatus comprising:
means for processing at least one data symbol stream based on a transmit diversity scheme to generate at least two coded symbol streams; and
means for performing spatial processing on the at least two coded symbol streams to generate a plurality of transmit symbol steams for transmission via a plurality of antennas.

31. The apparatus of claim 30, wherein the means for processing the at least one data symbol stream based on the transmit diversity scheme comprises
means for processing the at least one data symbol stream based on a space-time transmit diversity (STTD) scheme, a space-frequency transmit diversity (SFTD) scheme, or an orthogonal transmit diversity (OTD) scheme to generate the at least two coded symbol streams.

32. The apparatus of claim 30, wherein the means for performing spatial processing on the at least two coded symbol streams comprises means for performing spatial spreading on the at least two coded symbol streams with a plurality of matrices, and means for using different matrices for different frequency subbands, different time intervals, or both.

33. A computer-program apparatus comprising a memory having one or more software modules stored thereon, the one or more software modules being executable by one or more processors and the one or more software modules comprising:

code for processing data symbols based on a transmit diversity scheme to generate coded symbols; and code for performing spatial processing on the coded symbols to generate transmit symbols for transmission via a plurality of antennas.

34. The computer-program apparatus of claim 33, wherein the code for processing the data symbols based on the transmit diversity scheme comprises code for processing the data symbols based on a space-time transmit diversity (STTD) scheme, a space-frequency transmit diversity (SFTD) scheme, or an orthogonal transmit diversity (OTD) scheme to generate the coded symbols.

35. The computer-program apparatus of claim 33, wherein the code for performing spatial processing on the coded symbols comprises code for performing spatial spreading with a plurality of matrices, and using different matrices for different frequency subbands, different time intervals, or both.

36. The computer-program apparatus of claim 33, further comprising:

code for applying different cyclic delays for the plurality of antennas.

37. A computer-program apparatus comprising a memory having one or more software modules stored thereon, the one or more software modules being executable by one or more processors and the one or more software modules comprising:

code for processing at least one data symbol stream based on a transmit diversity scheme to generate at least two coded symbol streams; and code for performing spatial processing on the at least two coded symbol streams to generate a plurality of transmit symbol steams for transmission via a plurality of antennas.

38. The computer-program apparatus of claim 37, wherein the code for processing the at least one data symbol stream based on the transmit diversity scheme comprises code for processing the at least one data symbol stream based on a space-time transmit diversity (STTD) scheme, a space-frequency transmit diversity (SFTD) scheme, or an orthogonal transmit diversity (OTD) scheme to generate the at least two coded symbol streams.

39. The computer-program apparatus of claim 37, wherein the code for performing spatial processing on the at least two coded symbol streams comprises code for performing spatial spreading on the at least two coded symbol streams with a plurality of matrices, and using different matrices for different frequency subbands, different time intervals, or both.

* * * * *